(12) United States Patent
Chakravarty et al.

(10) Patent No.: US 8,325,591 B2
(45) Date of Patent: Dec. 4, 2012

(54) SUPPRESSING CROSS-POLARIZATION INTERFERENCE IN AN ORTHOGONAL COMMUNICATION LINK

(75) Inventors: Sumantra Chakravarty, San Diego, CA (US); Ahmad Jalali, Rancho Santa Fe, CA (US); Leonard Norman Schiff, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2136 days.

(21) Appl. No.: 10/788,729

(22) Filed: Feb. 26, 2004

(65) Prior Publication Data

US 2005/0190689 A1   Sep. 1, 2005

(51) Int. Cl.
*H04J 11/00*   (2006.01)

(52) U.S. Cl. .................................... 370/208

(58) Field of Classification Search .............. None
See application file for complete search history.

(56) References Cited

U.S. PATENT DOCUMENTS

| | | | | |
|---|---|---|---|---|
| 5,640,386 A * | 6/1997 | Wiedeman | | 370/320 |
| 5,734,647 A * | 3/1998 | Yoshida et al. | | 370/335 |
| 5,898,362 A * | 4/1999 | Ibanez-Meier et al. | | 370/320 |
| 5,930,230 A * | 7/1999 | Odenwalder et al. | | 370/208 |
| 5,943,372 A * | 8/1999 | Gans et al. | | 375/347 |
| 5,966,373 A * | 10/1999 | Stephenson et al. | | 370/335 |
| 6,038,250 A * | 3/2000 | Shou et al. | | 375/143 |
| 6,044,062 A | 3/2000 | Brownrigg et al. | | |
| 6,044,074 A | 3/2000 | Zehavi et al. | | |
| 6,154,659 A | 11/2000 | Jalali et al. | | |
| 6,356,555 B1 | 3/2002 | Rakib et al. | | |
| 6,442,152 B1 | 8/2002 | Park et al. | | |
| 6,510,172 B1 * | 1/2003 | Miller | | 375/140 |
| 6,917,581 B2 | 7/2005 | Proctor, Jr. et al. | | |
| 7,072,324 B1 * | 7/2006 | Kim et al. | | 370/342 |
| 7,310,379 B2 * | 12/2007 | Sibecas et al. | | 375/267 |
| 7,593,449 B2 * | 9/2009 | Shattil | | 375/130 |
| 7,911,993 B2 * | 3/2011 | Proctor et al. | | 370/324 |
| 2002/0115473 A1 * | 8/2002 | Hwang et al. | | 455/562 |

(Continued)

FOREIGN PATENT DOCUMENTS

CN   1133658 A   10/1996

(Continued)

OTHER PUBLICATIONS

Cruz and Santhanam, "Optimal Link Scheduling and Power Control in CDMA Multihop Wireless Networks," IEEE Global Telecommunications Conference, Taipei, Taiwan, Nov. 17-21, pp. 52-56, (2002).

(Continued)

*Primary Examiner* — Nittaya Juntima
*Assistant Examiner* — Rhonda Murphy
(74) *Attorney, Agent, or Firm* — Raphael Freiwirth

(57) ABSTRACT

An OCDMA transmission arrangement involves encoding both first and second nominally orthogonal polarization signals with a same long code, and transmitting the long-encoded first and second nominally orthogonal polarization signals from respective first and second transmission sources to at least one destination. A corresponding OCDMA demodulating arrangement demodulates the first and second nominally orthogonal polarization signals that were transmitted from respective first and second transmission sources after having been encoded with the same long code. The demodulation arrangement involves receiving the encoded first and second nominally orthogonal polarization signals, and applying the same long code to the received encoded first and second nominally orthogonal polarization signals.

16 Claims, 4 Drawing Sheets

U.S. PATENT DOCUMENTS

| | | | |
|---|---|---|---|
| 2002/0172217 A1* | 11/2002 | Kadaba et al. | 370/443 |
| 2002/0181388 A1* | 12/2002 | Jain et al. | 370/208 |
| 2003/0161268 A1 | 8/2003 | Larsson et al. | |
| 2004/0037261 A1 | 2/2004 | Suzuki | |
| 2004/0071115 A1* | 4/2004 | Earnshaw et al. | 370/335 |
| 2004/0132494 A1* | 7/2004 | Tirkkonen et al. | 455/562.1 |
| 2005/0213644 A1* | 9/2005 | Iwamoto et al. | 375/149 |
| 2005/0243896 A1* | 11/2005 | Yuan | 375/146 |
| 2006/0239334 A1* | 10/2006 | Kwon et al. | 375/132 |

FOREIGN PATENT DOCUMENTS

| | | |
|---|---|---|
| JP | 9-162842 | 6/1997 |
| JP | 2002186018 | 6/2002 |
| JP | 2001-242851 | 2/2003 |
| JP | 2004536512 A | 12/2004 |
| KR | 2000011693 | 2/2000 |
| WO | 9512937 | 5/1995 |
| WO | 03009099 | 1/2003 |
| WO | 2004023668 | 3/2004 |

OTHER PUBLICATIONS

Santhanam and Cruz, "Optimal routing, link scheduling and power control in multi-hop wireless networks," *Proc. IEEE Infocom.* 1:702-711 (2003).

Japanese Office Action for Application No. 2007-500829, dated Dec. 19, 2008, 5 pages.

Indian dated Nov. 30, 2009 for IN Application Serial No. 4965/DELNP/2006, 2 pages.

Office Action mailed Jan. 14, 2008 for Australian Patent Application No. 2005216343, 12 pages.

Office Action mailed Mar. 5, 2010 for Canadian Patent Application No. 2,557,591, 3 pages.

Office Action mailed Jan. 8, 2009 for Canadian Patent Application No. 2,557,591, 2 pages.

Office Action mailed Apr. 20, 2007 for Chilean Patent Application No. 0388-2005, 23 pages.

Office Action mailed Sep. 15, 2008 for Chilean Patent Application No. 0388-2005, 12 pages.

Office Action mailed Dec. 19, 2008 for Chinese Patent Application No. 200580013015.0, 17 pages.

Office Action mailed Sep. 4, 2009 for Chinese Patent Application No. 200580013015.0, 32 pages.

International Search Report & Written Opinion for PCT Application No. PCT/US05/006633, 11 Pages.

Office Action mailed Apr. 28, 2009 for Japanese Patent Application No. 2007-500829, 27 pages.

Office Action mailed Jan. 31, 2008 for Korean Patent Application No. 2006-7019898, 10 pages.

Office Action mailed Aug. 7, 2007 for Russian Patent Application No. 2006134042, 8 pages.

Office Action mailed Oct. 20, 2011, for Taiwanese Patent Application No. 094105857, 6 pages.

* cited by examiner

SUPPRESSING CROSS-POLARIZATION INTERFERENCE IN AN ORTHOGONAL COMMUNICATION LINK

BACKGROUND OF THE INVENTION

I. Field of Invention

The invention relates to suppression of cross-polarization interference in communications systems in which orthogonal channels are used. More particularly, the invention relates to orthogonal code division multiple access (OCDMA) communications systems in which the same long code is used in both polarization channels (for example, left hand channel and right hand channel), while substantially maintaining cross-polarization interference suppression.

II. Related Art

In conventional communications systems, it is known to simultaneously use left and right polarizations to increase capacity. Channels within each polarization may be made orthogonal using, for example, Walsh code techniques. Conventional wisdom with CDMA (code division multiple access) further teaches use of randomization (for example, by long code spreading) to help combat such problems as interference at boundaries of cells or sectors, multipath problems, and so forth. However, conventional long code spreading, involving distinct long codes for orthogonal channels, does not appear to result in the optimum signal to interference-plus-noise ratio (SINR).

Accordingly, there is a need in the art to provide an arrangement for effectively maximizing SINR (and, by implication, minimizing frame error rate (FER)), thus providing a higher theoretical throughput for a given overall noise and interference environment.

SUMMARY

An OCDMA transmission arrangement involves encoding both first and second nominally orthogonal polarization signals with a same long code, and transmitting the long-encoded first and second nominally orthogonal polarization signals from respective first and second transmission sources to at least one destination. A corresponding OCDMA demodulation arrangement demodulates the first and second nominally orthogonal polarization signals that were transmitted from respective first and second transmission sources after having been encoded with a same long code. The demodulation arrangement involves receiving the encoded first and second nominally orthogonal polarization signals, and applying the same long code to the received encoded first and second nominally orthogonal polarization signals.

BRIEF DESCRIPTION OF THE DRAWINGS

A more complete appreciation of the described embodiments is better understood by reference to the following Detailed Description considered in connection with the accompanying drawings, in which like reference numerals refer to identical or corresponding parts throughout, and in which.

DETAILED DESCRIPTION

Figure 1:
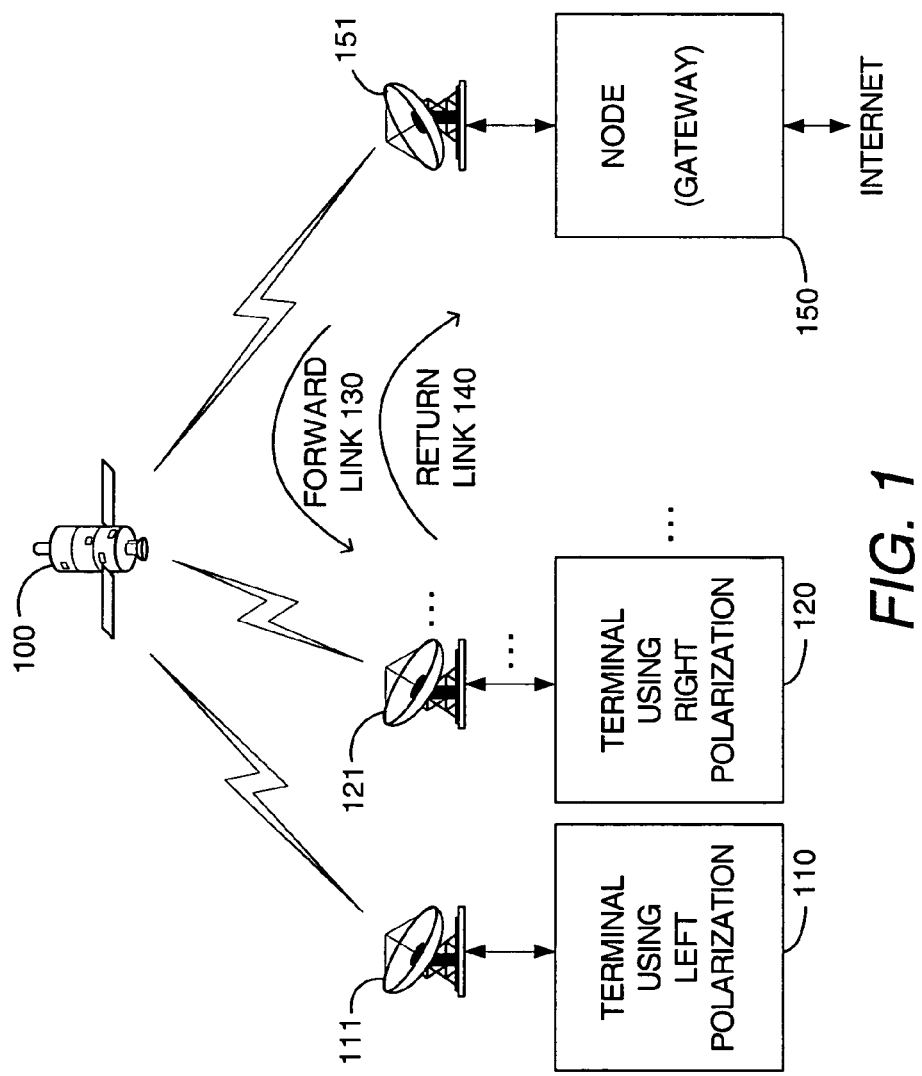
FIG. 1 schematically indicates a possible application of the cross-polarization interference suppression arrangement.

In describing embodiments illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

Moreover, features and procedures whose implementations are well known to those skilled in the art are omitted for brevity. For example, initiation and termination of software loops, communication of parameters from one part of a network to another required to carry out its functions, and so forth, lie within the ability of those skilled in the art. Likewise, such elements as multipliers, spreaders, adders, combiners, mixers, filters, code generators, up-converters, down-converters, also lie within the ability of those skilled in the art, and accordingly any detailed presentation thereof may be omitted.

Further, various aspects, features and embodiments of the data communication system may be described as a process that can be depicted as a flowchart, a flow diagram, a structure diagram, or a block diagram. Although a flowchart may describe the operations as a sequential process, many of the operations can be performed in parallel, concurrently, or in a different order than that described. Operations not needed or desired for a particular implementation may be omitted. A process may correspond to a method, a function, a procedure, a software module, a subroutine, a subprogram, or any combination thereof.

The present description may refer to customer premise equipments (CPEs), and to gateways between terrestrial and satellite communication networks. However, it is understood that these terms apply broadly to terminals, workstations, personal computers, and the like, in general; likewise, the described arrangements broadly apply to routers, switches, proxy servers, nodes, and the like, in general. Moreover, functions such as control functions that are described as being implemented or executed at a particular location in a network, may also be performed at other suitable location(s) in the network.

The following description may refer to "random access channels" (such as that specified in TIA/EIA/IS95), or to reservation-oriented channels (such as that disclosed in U.S. patent application Ser. No. 10/428,953, filed on May 1, 2003, entitled "Orthogonal Code Division Multiple Access On Return Link Of Satellite Links"). These channels are merely exemplary channel types; the present arrangement may be applied to other channel types.

Various terms that are used in this specification are to be given their broadest reasonable interpretation when used in interpreting the claims.

Briefly, at least three types of channels may be provided that are suitable for use in the return link (RL) of embodiments of the communications network described in this specification. The three types of channels include:

The Random Access Channel (RACH) uses a reservationless management method permitting random access to the communications medium, and employs ACDMA (asynchronous code division multiple access) techniques. The RACH thus provides access at "random" (unscheduled) times, but at the expense of overall data rate.

The REServation CHannel (RESCH) uses a reservation-oriented management method permitting access to the medium based on a limited number of codes (Walsh codes) that are assigned by (for example) a gateway to respective terminals so that the gateway may reliably distinguish among the terminals. The codes are mutually orthogonal, ensuring that communications from different terminals do not interfere with each other. The RESCH thus employs OCDMA (orthogonal code division multiple access) and is more efficient than the RACH in terms of overall data rate, though at the expense of the flexibility provided by RACH's random (unscheduled) access capability. In some embodiments, the RESCH may include a sub-channel called the "always-on" channel.

The Heartbeat Channel (HCH) relates to a feedback channel between the CPE and the gateway.

Of particular relevance to the present cross-polarization interference suppression arrangement is the Reservation Channel (RESCH). The physical channel structure used to support the RESCH is orthogonal CDMA (OCDMA). One may think of a TDMA approach using Walsh codes of length 1. The channel bandwidth in OCDMA is divided according to plural orthogonal Walsh codes of different lengths. Depending on a terminal's data rate requirement in the return link, in OCDMA the terminal is assigned an orthogonal Walsh code of a particular length. The bandwidth (defined by the assigned Walsh code) is allocated to a terminal for a specific time interval. Particular details of the physical layer channels, and of the mechanisms that may be used to achieve orthogonality among terminals' signals received at the gateway, are capable of being implemented by those skilled in the art.

Referring more specifically to cross-polarization interference reduction properties, the present inventors have realized that in certain scenarios, signal strength does not vary much (for example, only ±2 dB in certain satellite communications systems) and multi-path interference is of reduced importance. In such scenarios, the inventors have observed several phenomena.

First, a fixed but significant amount of interference may be experienced from users with opposite polarization with different long code spreading. Conversely, no interference is caused by most other users (using mutually different Walsh codes) because of good time synchronization. Admittedly, interference may be experienced from one user (the user assigned the same Walsh code), but this interference can be made relatively small by ensuring good polarization purity and antenna isolation.

Moreover, the inventors have recognized though simulation and link-budget analysis that not spreading by long code can be advantageous for certain satellite communications systems, in that a large contribution to interference in an orthogonal portion of a return link comes from a cross-polarization contribution experienced if different polarizations are spread with different long codes. Upon collectively analyzing all sources of interference, the inventors have recognized that distinguishing two polarization channels by differing long codes has the disadvantage that signal to interference-plus-noise ratio (SINR) is not in fact maximized for certain scenarios. To improve SINR (and by implication, to reduce frame error rate (FER)), the inventors provide an arrangement in which the same long code is applied to both polarizations.

FIG. 1 illustrates by way of non-limiting example, a context or application of the cross-polarization interference suppression arrangement, in which a return link (RL) of a communications network includes a satellite communications network. In FIG. 1, various "terminals" (customer premise equipments, CPEs) 110, 120, . . . are linked via respective satellite dishes 111, 121 . . . to satellite 100 and thus to a "node" (such as an Internet gateway) 150 via its satellite dish 151.

Forward link (FL) 130 denotes a direction of communication from the node to any of the terminals. Conversely, reverse link (RL, sometimes called return link) 140 denotes a direction of communication from any of the terminals to the node. The RL may be implemented using a combination of OCDMA and ACDMA techniques described above.

The CPEs (terminals) may vary in structure and operation, as may the gateway (nodes). Generally, the terminals and nodes have communication equipment operating according to mutually compatible communications protocols, such as TCP/IP and HTTP, allowing the terminals access to the Internet through the node. The node and terminals include respective processors configured to perform the features described herein. The node, when implementing an Internet gateway, also includes a proxy server to allow the nodes access to the Internet.

Figure 2:
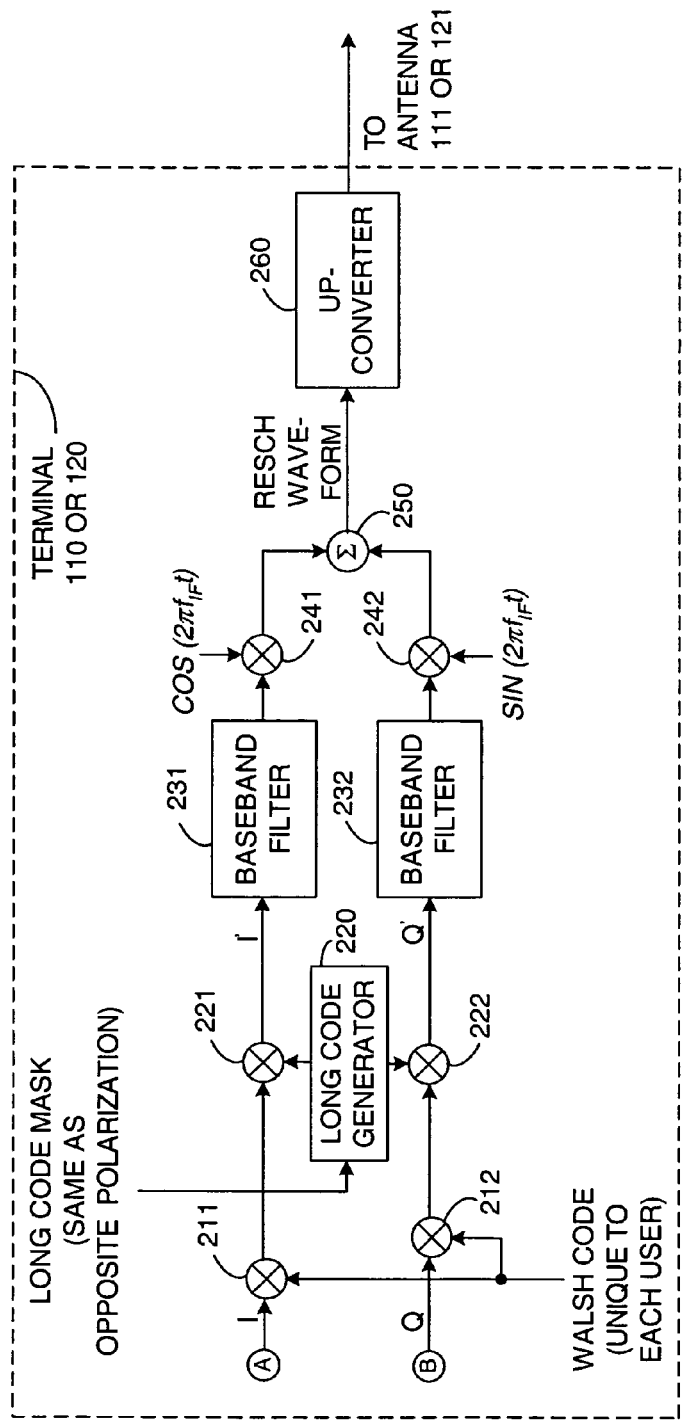
FIG. 2 illustrates an embodiment a terminal (110 or 120 in FIG. 1) at the transmitting end of a return link of a satellite communication system, in which the cross-polarization interference suppression arrangement may be practiced.

FIG. 2 illustrates an embodiment a terminal (110 or 120 in FIG. 1) at the transmitting end of a return link of a satellite communication system, in which the cross-polarization interference suppression arrangement may be practiced. In FIG. 2, in-phase and quadrature signals are provided at input points A and B. Signals at points A and B may be derived, for example, from a TDM multiplexer, the multiplexer selectively arranging signals such as:

users' data that may be in the form of physical-layer user data packets that may have been encoded, scrambled (channel-interleaved), modulated (such as by QPSK, PSK or QAM), and otherwise processed, pseudo-noise preambles, pilot signals, and/or others not specifically listed.

Of course, the cross-polarization interference suppression arrangement, to be described below, does not require any particular type or arrangement of data.

Data from different users may be found in the same time slot. In the described arrangement, a Walsh code is provided that is unique to each user. In-phase and quadrature signals from input points A and B are input to respective multipliers 211, 212, which are driven by Walsh codes unique to each user. The resulting signals, encoded according to each user, are passed to elements 221, 222, respectively.

For each Walsh symbol, elements 221, 222 combine the resulting signals from elements 211, 212, with a long code, which is a pseudo-noise sequence. A long code generator 220 provides the long codes to elements 221, 222 based on long code masks. In one embodiment, long code periods are significantly shorter (for example, two hundred times shorter) than Walsh code periods.

Significantly, the same long code mask is used for both left and right polarizations. That is, referring to FIG. 1, the same long code mask may be used for both terminal 110 (left polarization) and terminal 120 (right polarization). This use of the same long code mask for both polarizations contrasts with conventional arrangements, in which mutually distinct long code mask are used for the different polarizations.

Resulting signals from elements 221, 222 are provided to baseband filters 231, 232, respectively. Filters 231, 232 perform a pulse shaping function, and provide respective signals to mixers 241, 242. Mixers 241, 242 are driven by respective intermediate frequency (IF) signals, represented by cos $2\pi f_{IF}t$ and sin $2\pi f_{IF}t$.

In-phase and quadrature radio frequency signals from mixers 241, 242 are input to an adder 250, forming a RESCH (reservation channel) waveform whose general characteristics were discussed above. The RESCH waveform is an orthogonal CDMA (OCDMA) signal. The orthogonality of the CDMA signal is provided by strategic application of Walsh code techniques in elements 211, 212. The fact that the RESCH signal is an orthogonal CDMA signal ensures that the use of the same long code mask for elements 221, 222 does not compromise cross-polarization interference suppression.

The RESCH waveform from adder 250 is fed through an up-converter 260, which drives antenna 111 or 121 transmitting from terminal 110 or 120, respectively, to satellite 100 (FIG. 1).

To convey a general idea of a typical communication system to which the present embodiment may be applied, signals at various points in FIG. 2 may have the following bit rates, symbol rates, or transmission frequencies:

Signals A, B: 375-500 ksps (kilo-symbols per second)
Output of 211, 212: 3 Msps (Mega-symbols per second)
Output of 221, 222: 3 Msps
Output of 231, 232: 3 Msps
Output of 241, 242: 3.0 MHz (assumes 1 Hz/bps spectral efficiency; assumes bi-phase shift keying, BPSK)
Output of 250: 3.0 Mbps (Megabits per second; becomes 6 Msps after quadrature summing; assuming quadrature phase shift keying, QPSK)
Output of 260: 3.0 MHz at carrier frequency of 30 GHz Of course, these are merely non-limiting examples of bit rates and transmission frequencies for which the present cross-polarization interference suppression arrangement is useful. Those skilled in the art will readily appreciate that the present cross-polarization interference suppression arrangement functions with different bit rates and transmission frequencies, and thus the invention should not be limited by the examples described herein.

Figure 3:
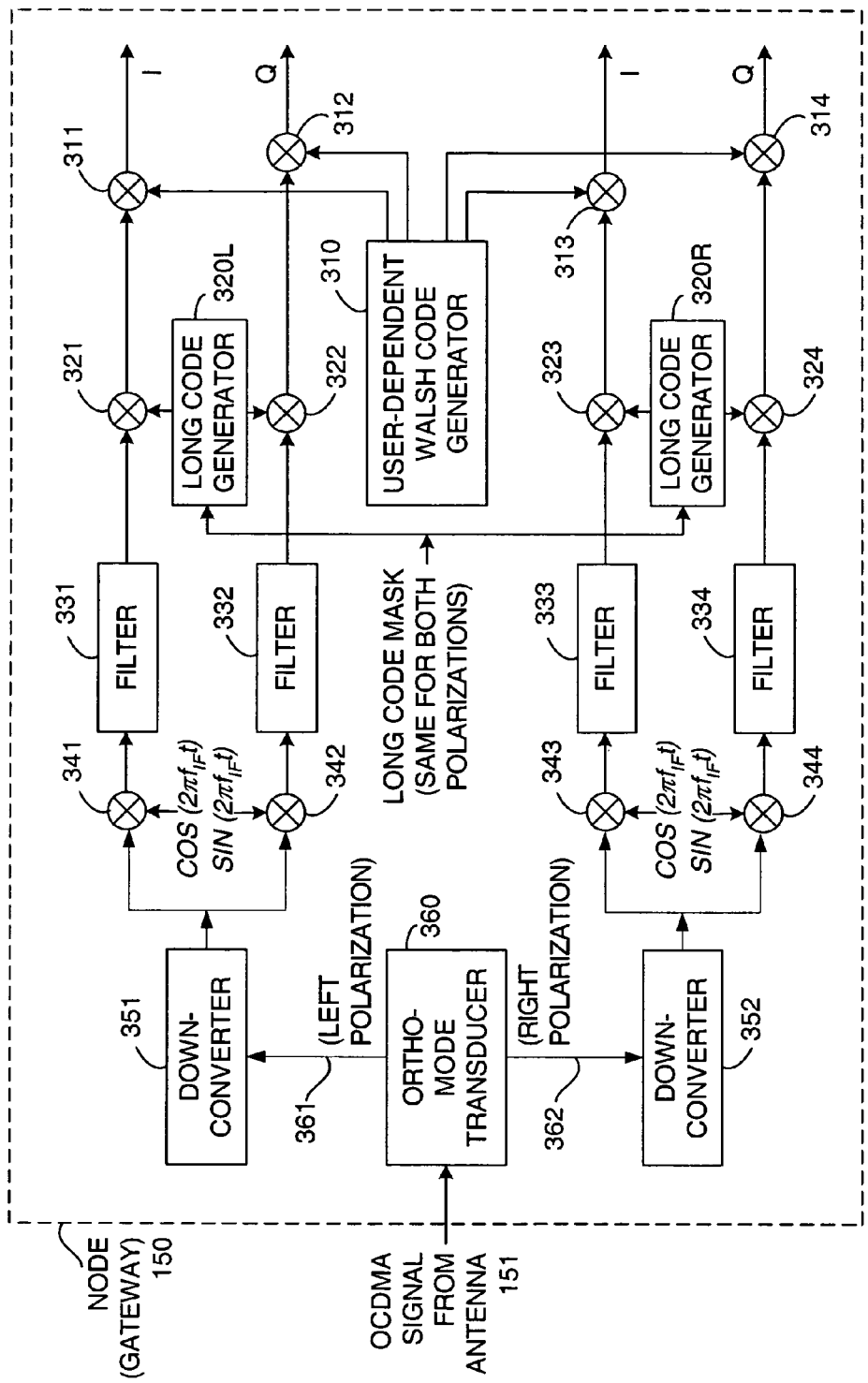
FIG. 3 illustrates an embodiment of a node (such as a gateway 150 in the satellite communication system of FIG. 1) at the receiving end of a return link of a satellite communication system, in which the cross-polarization interference suppression arrangement may be practiced.

FIG. 3 illustrates an embodiment of a node (such as a gateway 150 in the satellite communication system of FIG. 1) at the receiving end of a return link of a satellite communication system, in which the cross-polarization interference suppression arrangement may be practiced. In large part, functions at the receiving end node or gateway 150 (FIG. 3) are performed in a reverse order from the functions performed at the transmitting end 110, 120 (FIG. 2).

Referring more specifically to FIG. 3, antenna 151 receives a signal from satellite 100 and feeds the received signal to an ortho-mode transducer (OMT) 360. OMT 360 divides the received orthogonal CDMA signal into a left polarization signal provided on path 361 and a right polarization signal provided on path 362. The left polarization signal originated from (for example) terminal 110 (FIG. 1), and the right polarization signal originated from (for example) terminal 120 (FIG. 1).

The left polarization signal on path 361 is fed to down-converter 351 and then to mixers 341, 342. Mixers 341, 342 receive respective orthogonal-phase intermediate frequency (IF) signals cos $2\pi f_{IF}t$ and sin $2\pi f_{IF}t$. Mixers 341, 342 provide in-phase and quadrature signals, respectively, to filters 331, 332, respectively, which perform a pulse shaping function.

Filters 331, 332 provide filtered signals to elements 321, 322, respectively. Elements 321, 322 receive the same long code from long code generator 320L. Long code generator 320L, whose "L" designates left polarization signals from terminal 110 (FIG. 1), receives the same long code mask as a long code generator 320R, whose "R" designates right polarization signals from terminal 120 (FIG. 1). Elements 321, 322 provide long-code-decoded signals to multipliers 311, 312.

FIG. 3 shows elements 311, 312 receiving Walsh codes that are unique to each user. FIG. 3 is schematic, not literal, in this regard, showing only the general principle of Walsh channel data recovery. In practical implementations, all Walsh channels may be demodulated together, using fast Hadamard transform techniques. The drawings show only how a pair of Walsh functions are separated. The details of the process relating to Walsh codes are not pertinent to the use of a single long code mask for both polarizations, and accordingly a description of those Walsh code details is omitted. Elements 311, 312 provide signals to further circuitry not pertinent to the cross-polarization interference suppression arrangement, such as demultiplexers, decoders, channel de-interleavers, and the like.

In FIG. 3, elements 352, 343, 344, 333, 334, 320R, 323, 324, 313 and 314 perform functions for the right polarization signal on path 362 in a manner analogous to those described above, with reference to elements 351, 341, 342, 331, 332, 320L, 321, 322, 311 and 312, respectively, for the left polarization signal on path 361. Different, user-dependent Walsh codes are provided to elements 311-314. However, the same long code mask is used for both left and right polarizations, in contrast to conventional systems.

Figure 4:
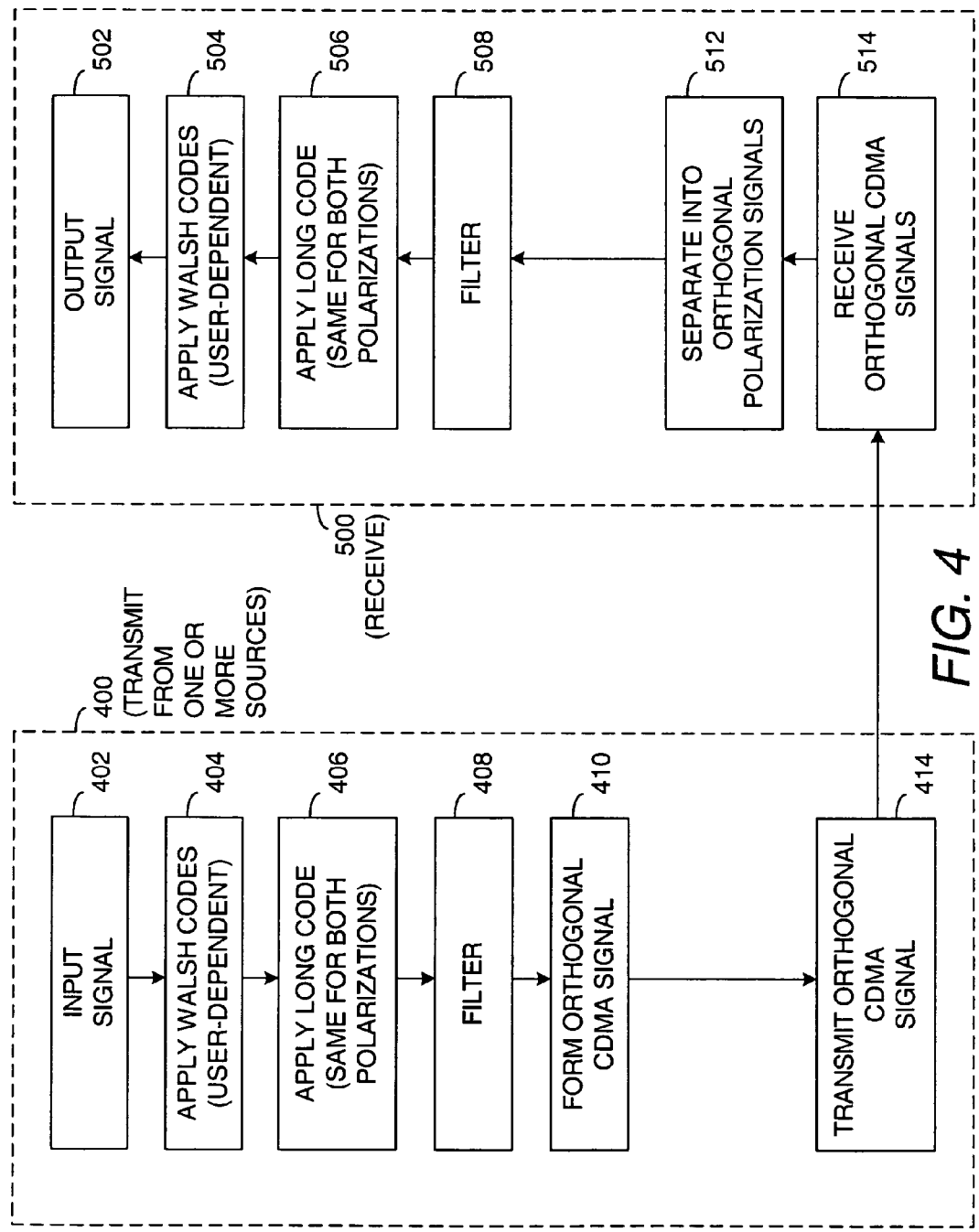
FIG. 4 shows a flow chart illustrating an embodiment of a cross-polarization interference suppression method.

FIG. 4 is a flow chart illustrating an embodiment of a cross-polarization interference suppression method. Steps within a transmitting method 400 are performed within one or more transmitting terminals 110 and/or 120, while steps within a receiving method 500 are performed within node (gateway) 150 (FIG. 1). The transmitting and receiving methods 400, 500 may be considered separate methods, or they may be collectively considered a single method.

Block 402 indicates the input of a signal containing user data (see FIG. 2 points A and B).

Block 404 indicates application of user-dependent Walsh codes to the input signals (see FIG. 2 elements 211, 212), thus orthogonalizing the signals.

Block 406 indicates application of the long code, which is the same long code for both the left and right polarizations (see FIG. 2 elements 220, 221, 222).

Block 408 indicates filtering of the resulting encoded signals (see FIG. 2 elements 231, 232).

Block 410 indicates formation of an orthogonal signal, especially an orthogonal CDMA signal, including both in-phase and quadrature components at radio frequency (see FIG. 2 elements 241, 242, 250).

Block 414 illustrates transmission of a signal on a communication medium (see FIG. 2 up-converter 260 and FIG. 1 antenna 111/121). The communication medium is broadly understood to include, for example, the return link 140 of a satellite communications system (FIG. 1).

Block 514 indicates reception of an orthogonal CDMA signal from the communication medium such as return link 140 (FIG. 1); see FIG. 3 antenna 151.

Block 512 illustrates the separation of the received signal into left and right polarization signals (see paths 351, 351 at the outputs of ortho-mode transducer (OMT) 350 in FIG. 3).

Block 508 indicates filtering of the signals from mixers 341-344 (see FIG. 3 elements 331-334) that have converted the left and right polarization signals down from radio frequency.

Block 506 indicates decoding of the filtered signals from both polarizations using the same long code mask (see FIG. 3 elements 320L, 320R, 321-324).

Block 504 indicates decoding using Walsh codes unique to each user (see FIG. 3 elements 310-314).

Block 502 indicates output of signals containing the user data to additional circuitry such as demultiplexers.

The foregoing embodiments may be distinguished from conventional arrangements in at least the following manner. It is known to simultaneously use left and right polarizations in a communications system, to increase capacity. Conventionally, the left and right polarization channels are spread by mutually distinct long codes. Accordingly, it has not been conventional to use the same long code on both left and right polarization channels. The inventors' non-conventional use of the same long code can be appreciated in the following way.

If each polarization channel has orthogonal sub-channels (created using Walsh code techniques, for example), it is possible to suppress cross-polarization interference from all but one user from the oppositely polarized pool of users. Distinctive Walsh codes suppress interference among users having the same polarization. Distinctive long codes, if used, would suppress interference, but since a same long code is used for both polarizations there is non-random (non-noise-like) interference between the particular users having the same Walsh code but being in different polarizations.

Tests have shown that this particular interference between this small number of users can be tolerated, given the fact that the interference compares closely with additive white Gaussian noise (AWGN), particularly with a properly chosen modulation scheme and with lower values of SINR. In one system having 17 dB of polarization isolation and 20 dB suppression from orthogonal coding, this arrangement provides a signal to interference-plus-noise ratio (SINR) gain of 0.4 dB with a frame error rate (FER) of 104. This gain is possible especially when multi-path effects are negligible, such as in satellite communications systems.

Also provided, for the methods described herein, are computer program products (such as storage media) storing program instructions for execution on a computer system having at least one data processing device, whose instructions when executed by the computer system cause the computer system to perform the methods described herein.

Further provided are systems for performing the methods described herein, the systems including at least one of a terminal (or customer premise equipment) and a node (such as a gateway). The terminals and nodes (or gateways), and the like, may readily be implemented by those skilled in the art. Generally, these elements may be implemented as any appropriate computers employing technology known by those skilled in the art to be appropriate to the functions performed. A terminal or node may be implemented using a conventional general purpose computer programmed according to the foregoing teachings, as will be apparent to those skilled in the computer art. Appropriate software can readily be prepared by programmers of ordinary skill based on the teachings of the present disclosure, as will be apparent to those skilled in the software art. Other suitable programming languages operating with other available operating systems may be chosen.

General purpose computers may implement the foregoing methods, in which the computer housing may house a CPU (central processing unit), memory such as DRAM (dynamic random access memory), ROM (read only memory), EPROM (erasable programmable read only memory), EEPROM (electrically erasable programmable read only memory), SRAM (static random access memory), SDRAM (synchronous dynamic random access memory), and Flash RAM (random access memory), and other special purpose logic devices such as ASICs (application specific integrated circuits) or configurable logic devices such GAL (generic array logic) and reprogrammable FPGAs (field programmable gate arrays).

Each computer may also include plural input devices (for example, keyboard, microphone, and mouse), and a display controller for controlling a monitor. Additionally, the computer may include a floppy disk drive; other removable media devices (for example, compact disc, tape, and removable magneto optical media); and a hard disk or other fixed high-density media drives, connected using an appropriate device bus such as a SCSI (small computer system interface) bus, an Enhanced IDE (integrated drive electronics) bus, or an Ultra DMA (direct memory access) bus. The computer may also include a compact disc reader, a compact disc reader/writer unit, or a compact disc jukebox, which may be connected to the same device bus or to another device bus.

As stated above, the system includes at least one computer readable medium. Examples of computer readable media include compact discs, hard disks, floppy disks, tape, magneto optical disks, PROMs (for example, EPROM, EEPROM, Flash EPROM), DRAM, SRAM, SDRAM).

Stored on any one or on a combination of computer readable media is software for controlling both the hardware of the computer and for enabling the computer to interact with a human user, to perform the functions described above. Such software may include, but is not limited to, user applications, device drivers, operating systems, development tools, and so forth.

Such computer readable media further include a computer program product including computer executable code or computer executable instructions that, when executed, causes a computer to perform the methods disclosed above. The computer code may be any interpreted or executable code, including but not limited to scripts, interpreters, dynamic link libraries, Java classes, complete executable programs, and the like.

From the foregoing, it will be apparent to those skilled in the art that a variety of arrangements (methods, systems, computer programs on recording media, and the like) are provided.

The present disclosure supports a transmission method that may involve encoding both first and second nominally orthogonal polarization signals with a same long code, and transmitting the long-encoded first and second nominally orthogonal polarization signals from respective first and second transmission sources to at least one destination.

The method may further involve orthogonalizing plural sub channels of each of the first and second nominally orthogonal polarization signals by applying respective plural mutually distinct Walsh codes in each sub channel. The orthogonalizing step may include applying different Walsh codes to different respective signals originating from different respective users of the communication system.

The transmitting step may be carried out in an orthogonal code division multiple access (OCDMA) communications system.

The transmitting step may include transmitting the long-encoded first and second nominally orthogonal polarization signals from plural first transmission sources and from plural second transmission sources, respectively, to the at least one destination.

The present disclosure also supports a communication method including the transmission method described above, and further involving, at the destination, receiving the encoded first and second nominally orthogonal polarization signals; and applying the same long code to the received encoded first and second nominally orthogonal polarization signals received at the destination.

The present disclosure further supports a method of demodulating first and second nominally orthogonal polarization signals that were transmitted from respective first and second transmission sources after having been encoded with a same long code. The method may involve receiving the encoded first and second nominally orthogonal polarization signals, and applying the same long code to the received encoded first and second nominally orthogonal polarization signals.

The method may further involve separating plural sub channels within each of the first and second nominally orthogonal polarization signals by applying respective plural mutually distinct Walsh codes in each sub channel. The separating step may involve applying different Walsh codes to different respective signals originating from different respective users of the communication system.

The receiving step may be carried out in an orthogonal code division multiple access (OCDMA) communications system.

The present disclosure also supports a communication method including the demodulating method described above, and further involving encoding both the first and second nominally orthogonal polarization signals with the same long code, and transmitting the long-encoded first and second nominally orthogonal polarization signals from respective first and second transmission sources to at least one destination at which the demodulating method is performed.

The transmitting step may involve transmitting the long-encoded first and second nominally orthogonal polarization signals from plural first transmission sources and from plural second transmission sources, respectively, to the at least one destination.

The present disclosure additionally supports a computer program product storing program instructions for execution on a computer system having at least one data processing device, whose instructions when executed by the computer system cause the computer system to perform the methods described above.

The present disclosure further supports systems configured to perform the methods described above.

The foregoing embodiments are merely examples and are not to be construed as limiting the invention. The present teachings can be readily applied to other types of apparatus. The description of the embodiments is intended to be illustrative, and not to limit the scope of the claims. Many alternatives, modifications, and variations will be apparent to those skilled in the art in light of the above teachings. For example, the particular implementation of terminals, nodes or gateways, may be varied without departing from the scope of the invention. Of course, the particular hardware or software implementation of the invention may be varied while still remaining within the scope of the present invention. It is therefore to be understood that within the scope of the appended claims and their equivalents, the invention may be practiced otherwise than as specifically described herein.

What is claimed is:

1. A method for reducing cross-polarization interference in a wireless communication system, comprising:
generating first data to be transmitted from a first transmission terminal;
encoding the first data with a long code at the first transmission terminal to produce a first long-encoded signal;
applying a first polarization to the first long-encoded signal to produce a first long-encoded, polarized signal; and
transmitting the first long-encoded, polarized signal from the first transmission terminal to at least one destination,
wherein the encoding the first data with the long code at the first transmission terminal comprises utilizing an identical long code also employed by a second transmission terminal transmitting signals having an orthogonal polarization to the first polarization.

2. The method of claim 1, further comprising:
orthogonalizing the first data transmitted by the first transmission terminal with respect to second data transmitted by the second transmission terminal.

3. The method of claim 2, wherein the orthogonalizing further comprises:
applying a first spreading code to the first data, originating from the first transmission terminal, to generate a first spread signal, wherein the first spreading code is distinct from a second spreading code utilized by the second transmission terminal to generate a second spread signal from the second data.

4. The method of claim 3, wherein the applying the first spreading code further comprises applying a first Walsh code, assigned to the first transmission terminal, to generate the first spread signal, wherein the first Walsh code is distinct from a second Walsh code assigned to the second transmission terminal.

5. A method, comprising:
receiving a signal, via an antenna;
dividing the signal received into a first signal, transmitted from a first transmission terminal, and a second signal, transmitted from a second transmission terminal, wherein the first signal and the second signal have orthogonal polarizations with respect to one another;
applying an identical long code to the first signal and the second signal to generate a first decoded signal and a second decoded signal, respectively;
applying a first orthogonal code to the first decoded signal to produce a first output signal corresponding to the first signal transmitted from the first transmission terminal; and
applying a second orthogonal code to the second decoded signal to produce a second output signal corresponding to the second signal transmitted from the second transmission terminal.

6. The method of claim 5, further comprising:
generating a first in-phase signal component and a first quadrature signal component of the first signal; and
performing respective pulse shaping operations on the first in-phase signal component and the first quadrature signal component.

7. A non-transitory computer-readable medium having stored thereon computer-executable instructions that, in response to execution, cause a computing device to perform operations, comprising:
encoding first data with a long code to produce a first long-encoded signal;
applying a first polarization to the first long-encoded signal to produce a first long-encoded, polarized signal; and
transmitting the first long-encoded, polarized signal to at least one destination,
wherein the encoding the first data with the long code comprises utilizing an identical long code employed by a disparate computing device to transmit, with an orthogonal polarization from the first polarization, second data.

8. A non-transitory computer-readable medium having stored thereon computer-executable instructions that, in response to execution, cause a computing device to perform operations, comprising:
- receiving a signal via an antenna;
- dividing the signal received into a first signal, which is transmitted from a first transmission terminal, and a second signal, which is transmitted from a second transmission terminal, wherein the first signal and the second signal have orthogonal polarizations with respect to one another;
- applying an identical long code to the first signal and the second signal to generate a first decoded signal and a second decoded signal, respectively;
- applying a first orthogonal code to the first decoded signal to produce a first output signal corresponding to the first signal transmitted from the first transmission terminal; and
- applying a second orthogonal code to the second decoded signal to produce a second output signal corresponding to the second signal transmitted from the second transmission terminal.

9. A transmission terminal configured to reduce cross-polarization interference, comprising:
- a long code generator configured to generate a long code, wherein the long code generated is identical to a second long code employed by a disparate transmission terminal transmitting signals having orthogonal polarization to a polarization utilized by the transmission terminal;
- a mixer configured to encode data with the long code to produce a long-encoded signal;
- a polarizer configured to apply the polarization to the long-encoded signal to produce a long-encoded, polarized signal; and
- a transmitter configured to transmit the long-encoded, polarized signal to at least one destination.

10. A receiver, comprising:
- an antenna configured to receive a signal that includes a first signal transmitted from a first transmission terminal and a second signal transmitted from a second transmission terminal, wherein the first signal and the second signal have orthogonal polarizations with respect to one another;
- an ortho-mode transducer configured to separate the first signal and the second signal based on respective and opposite polarizations, respectively associated with the first signal and the second signal;
- a first mixer configured to apply a long code to the first signal to produce a first decoded signal;
- a second mixer configured to apply the long code, identical to the long code applied by the first mixer, to the second signal to produce a second decoded signal;
- a third mixer configured to apply a first orthogonal code to the first decoded signal to produce first data that originates from the first transmission terminal; and
- a fourth mixer configured to apply a second orthogonal code to the second decoded signal to produce the second data that originates from the second transmission terminal.

11. A transmission system, comprising:
- means for encoding first data, generated at a first transmission terminal, with a long code to produce a first long-encoded signal;
- means for applying a first polarization to the first long-encoded signal to produce a first long-encoded, polarized signal; and
- means for transmitting the first long-encoded, polarized signal to a receiver,
- wherein the means for encoding the first data further comprises means for utilizing an identical long code to that employed by a second transmission terminal configured to transmit signals having an opposite orthogonal polarization to the first polarization.

12. The transmission system of claim 11, further comprising:
- means for orthogonalizing the first data to be transmitted by the first transmission terminal with respect to second data configured to be transmitted by the second transmission terminal.

13. The transmission system of claim 12, wherein the means for orthogonalizing further comprises:
- means for applying a first spreading code to the first data, originating from the first transmission terminal, to generate a first spread signal, wherein the first speading code is distinct from a second spreading code utilized by the second transmission terminal to generate a second spread signal from the second data.

14. The transmission system of claim 13, wherein the means for applying the first spreading code further comprises means for applying a first Walsh code, assigned to the first transmission terminal, to generate the first spread signal, wherein the first Walsh code is distinct from a second Walsh code assigned to the second transmission terminal.

15. A receiver system, comprising:
- means for receiving a signal;
- means for separating the signal received into a first signal, which is transmitted by a first terminal, and a second signal, which is transmitted by a second terminal, wherein the first signal and the second terminal have orthogonal polarizations with respect to one another;
- means for applying an identical long code to the first signal and the second signal to produce a first decoded signal and a second decoded signal, respectively;
- means for applying a first orthogonal code to the first decoded signal to produce a first output signal corresponding to the first signal transmitted from the first terminal; and
- means for applying a second orthogonal code to the second decoded signal to produce a second output signal corresponding to the second signal transmitted from the second terminal.

16. The receiver system of claim 15, further comprising:
- means for generating a first in-phase signal component and a first quadrature signal component of the first signal; and
- means for performing respective pulse shaping operations on the first in-phase signal component and the first quadrature signal component.

* * * * *